United States Patent
Arora et al.

(10) Patent No.: US 11,553,370 B2
(45) Date of Patent: Jan. 10, 2023

(54) ACCESS NETWORK COLLECTIVE ADMISSION CONTROL

(71) Applicant: Parallel Wireless, Inc., Nashua, NH (US)

(72) Inventors: Jitender Arora, Westford, MA (US); Yang Cao, Westford, MA (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/202,083

(22) Filed: Nov. 27, 2018

(65) Prior Publication Data

US 2019/0166518 A1 May 30, 2019

Related U.S. Application Data

(60) Provisional application No. 62/591,134, filed on Nov. 27, 2017.

(51) Int. Cl.
*H04W 28/02* (2009.01)
*H04W 48/06* (2009.01)
(Continued)

(52) U.S. Cl.
CPC ... *H04W 28/0268* (2013.01); *H04W 28/0284* (2013.01); *H04W 28/0289* (2013.01);
(Continued)

(58) Field of Classification Search
CPC ......... H04W 28/0268; H04W 28/0284; H04W 28/0289; H04W 28/20; H04W 48/06;
(Continued)

(56) References Cited

U.S. PATENT DOCUMENTS

| 5,491,801 A | 2/1996 | Jain et al. |
| 9,320,051 B2 | 4/2016 | Rydnell et al. |

(Continued)

FOREIGN PATENT DOCUMENTS

| EP | 1654625 B1 | 5/2006 |
| WO | 2007136339 A3 | 11/2007 |
| WO | 2016091285 A1 | 6/2016 |

OTHER PUBLICATIONS

"Explicit Congestion Notification", Wikipedia, The Free Encyclopedia, retrieved Jun. 16, 2016.
(Continued)

*Primary Examiner* — Gregory B Sefcheck
*Assistant Examiner* — Joshua Smith
(74) *Attorney, Agent, or Firm* — Michael Y. Saji; David W. Rouille (57) ABSTRACT

A method for congestion mitigation via admission control in a shared-backhaul telecommunications network is disclosed, comprising: assessing a congestion state in a multi-node radio access network having a shared backhaul connection, the congestion state based on congestion of the shared backhaul connection; retrieving an admission control policy based on the congestion state of the shared backhaul connection; performing a policy action of the admission control policy at a first base station acting as a gateway for the multi-node radio access network with respect to the shared backhaul connection; and sending the admission control policy to other nodes in the multi-node radio access network, thereby causing the other nodes to perform the policy action, wherein the policy action is denying a request from a user equipment to attach to the radio access network.

18 Claims, 5 Drawing Sheets

(51) Int. Cl.
*H04W 72/04* (2009.01)
*H04W 28/20* (2009.01)
*H04W 92/04* (2009.01)
*H04W 84/18* (2009.01)

(52) U.S. Cl.
CPC ............ *H04W 28/20* (2013.01); *H04W 48/06* (2013.01); *H04W 72/0493* (2013.01); *H04W 92/045* (2013.01); *H04W 84/18* (2013.01)

(58) Field of Classification Search
CPC ........... H04W 72/0493; H04W 92/045; H04W 84/18; H04L 47/14; H04L 47/2441
See application file for complete search history.

(56) References Cited

U.S. PATENT DOCUMENTS

| | | | |
|---|---|---|---|
| 9,350,734 | B1 | 5/2016 | Jamshidi et al. |
| 9,554,367 | B1 | 1/2017 | Liu et al. |
| 2003/0048791 | A1 | 3/2003 | De Cnodder et al. |
| 2006/0133272 | A1 | 6/2006 | Yuan et al. |
| 2008/0075003 | A1 | 3/2008 | Lee et al. |
| 2008/0126531 | A1* | 5/2008 | Setia ............... H04W 48/02 709/224 |
| 2010/0005178 | A1 | 1/2010 | Sindelaru et al. |
| 2011/0170411 | A1* | 7/2011 | Wang ............... H04W 76/10 370/235 |
| 2012/0135739 | A1 | 5/2012 | Paterson |
| 2013/0072146 | A1 | 3/2013 | Smith |
| 2014/0056132 | A1* | 2/2014 | Lim ............... H04W 28/0284 370/230 |
| 2014/0369190 | A1* | 12/2014 | Chan ............... H04L 47/24 370/230 |
| 2015/0049606 | A1* | 2/2015 | So ............... H04L 47/808 370/230 |
| 2015/0103755 | A1 | 4/2015 | Cui et al. |
| 2016/0057658 | A1 | 2/2016 | Horn et al. |
| 2016/0066199 | A1* | 3/2016 | Yeddala ............ H04W 28/0289 370/252 |
| 2016/0080275 | A1* | 3/2016 | Kumaresh ......... H04L 43/062 709/224 |
| 2016/0135107 | A1 | 5/2016 | Hampel et al. |
| 2016/0219605 | A1* | 7/2016 | Karlsson ............ H04W 72/10 |
| 2016/0277992 | A1 | 9/2016 | Cao |
| 2016/0308755 | A1 | 10/2016 | Garg |
| 2017/0013513 | A1 | 1/2017 | Agarwal et al. |
| 2017/0019750 | A1* | 1/2017 | Palanisamy ....... H04W 28/0289 |
| 2018/0084518 | A1* | 3/2018 | Cattoni ............ H04L 61/2038 |
| 2018/0123950 | A1 | 5/2018 | Garg et al. |
| 2018/0367569 | A1* | 12/2018 | Verma ............ H04L 63/1408 |
| 2019/0037629 | A1* | 1/2019 | Ryu ............ H04W 76/28 |

OTHER PUBLICATIONS

"Expanded Prioritization for VoLTE/Emergency Calls", Cisco Systems, Inc., P-GW Administration Guide, StarOS Release 21.1., Jan. 27, 2017.
Fernando Rodini, "QoS/QoE Developments in 4G-IoT & 5G Technologies", Qualcomm Incorporated, Nov. 27, 2017.
"ITU Workshop on Telecommunications Service Quality", The International Telecommunication Union, ITU Plenipotentiary Conference, Programme, Dubai, Nov. 27, 2017.
3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 8)", Dec. 2007, 3GPP TS 23.401 V8.0.0.
K. Nichols, S. Blake, F. Baker, D. Black, "Definition of the Differentiated Services Field (DS Field) in the IPv4 and IPv6 Headers", The Internet Society, Dec. 1998, Network Working Group, Request for Comments: 2474.
S. Blake, D. Black, M. Carlson, E. David, Z. Wang, W. Weiss, "An Architecture for Differentiated Services", Dec. 1998, The Internet Society, Network Working Group, Request for Comments: 2475.
K. Ramakrishnan, S. Floyd, D. Black, "The Addition of Explicit Congestion Notification (ECN) to IP", Sep. 2001, The Internet Society, Network Working Group, Request for Comments: 3168.
D. Grossman, "New Terminology and Clarifications for Diffserv", Apr. 2002, The Internet Society, Network Working Group, Request for Comments: 3260.
B. Fenner, "Experimental Values in IPv4, IPV6, ICMPv4, ICMPv6, UDP, and TCP Headers", Nov. 2006, Network Working Group, Request for Comments: 4727.
European Telecommunications Standards Institute, Digital cellular telecommunications system (Phase 2+) (GSM); Universal Mobile Telecommunications System (UMTS); LTE; Mobile radio interface Layer 3 specification; Core network protocols; Stage 3 (3GPP TS 24.008 version 13.7.0 Release 13), Oct. 2016, ETSI TS 124 008 V13.7.0.
European Telecommunications Standards Institute, Universal Mobile Telecommunications System (UMTS); LTE; Non-Access-Stratum (NAS) protocol for Evolved Packet Systems (EPS); Stage 3 (3GPP TS 24.301 version 10.3.0 Release 10), Jun. 2011, ETSI TS 124 301 V10.3.0.

* cited by examiner

ACCESS NETWORK COLLECTIVE ADMISSION CONTROL

CROSS-REFERENCE TO RELATED APPLICATIONS

This application claims priority under 35 U.S.C. § 119(e) to U.S. Provisional Pat. App. No. 62/591,134, titled "Mesh & LTE Access Collective Admission Control" and filed on Nov. 27, 2017, which is also hereby incorporated by reference in its entirety for all purposes. This application also hereby incorporates by reference U.S. patent application Ser. No. 15/607,425, "End-to-End Prioritization for Mobile Base Station," filed May 26, 2017, in its entirety for all purposes. This application also hereby incorporates by reference for all purposes the most recent versions of the following documents dated as of the priority date of the present application: IETF RFC 2474; IETF RFC 2475; IETF RFC 3260; IETF RFC 4727; 3GPP TS 23.401; 3GPP TS 24.301; 3GPP TS 24.008. This application hereby incorporates by reference, for all purposes, each of the following U.S. patents and U.S. patent application Publications in their entirety: US20140086120A1; US20140133456A1; US20140192643A1; US20140233412A1; US20150009822A1; US20150078167A1; US20150092688A1; US20150257051A1; US20160373958A1; US20160308755A1; US20170013513A1; US20170019375A1; US20170026845A1; US20170048710A1; US20170055186A1; US20170064621A1; US20170070436A1; US20170077979A1; US20170111482A1; US20170127409A1; US20170171828A1; US20170181119A1; US20170202006A1; US20170208560A1; US20170238278A1; US20170257133A1; US20170272330A1; US20170273134A1; US20170288813A1; US20170295510A1; US20170303163A1; US20180123950A1; U.S. Pat. Nos. 8,867,418; 8,867,418; 8,879,416; 9,107,092; 9,113,352; 9,232,547; WO2013145592.

BACKGROUND

It is possible to create a Long Term Evolution (LTE) network where certain base stations are backhauled using a wireless network, such as a mesh, Wi-Fi or LTE-based backhaul connection. Depending on usage by mobile subscribers, the number of base stations being backhauled, available bandwidth, applications running, traffic activity on various user equipment devices, severe traffic or bad radio connections, congestion may occur at one or more mesh network links or backhaul links. Congestion may of course adversely impact network operations and providing reasonable service. The case of congestion occurring at the backhaul connection has a greater adverse effect on the network than other types of congestion. This is because all traffic from all users accessing the radio access network shared backhaul connection need to use the shared backhaul connection.

The radio access network generally has traffic of different kinds, such as wired or wireless internet traffic, 3G/4G Voice/Data, signaling traffic such as S1, X2, Iu, radio access bearer assignment, operations administrations and management, etc.; and each type of traffic has its own mechanism to indicate priority of the message. The traffic is generally transported over private virtual private network tunnels, e.g. using IPSec, and are therefore encrypted and encapsulated. Prioritization is particularly needed for emergency services traffic. The trend of using industry-standard LTE and VoLTE for first responders makes this issue more pressing as well.

A solution is therefore needed for prioritizing messages in a radio access network that utilizes shared backhaul.

SUMMARY

Systems and methods for congestion mitigation via admission control in a shared-backhaul telecommunications network are disclosed.

In a first embodiment, a method is disclosed for congestion mitigation via admission control in a shared-backhaul telecommunications network, comprising: assessing a congestion state in a multi-node radio access network having a shared backhaul connection, the congestion state based on congestion of the shared backhaul connection; retrieving an admission control policy based on the congestion state of the shared backhaul connection; performing a policy action of the admission control policy at a first base station acting as a gateway for the multi-node radio access network with respect to the shared backhaul connection; and sending the admission control policy to other nodes in the multi-node radio access network, thereby causing the other nodes to perform the policy action, The policy action may be denying a request from a user equipment to attach to the radio access network. The method may further comprise performing a second policy action of a second admission control policy in response to a first escalated congestion state, The second policy action may be dropping existing connections to user equipments that have only non-prioritized data connections. The method may further comprise performing a third policy action of a third admission control policy in response to a second escalated congestion state, The third policy action may be preempting existing prioritized user data connections in favor of higher-priority user data connections. The method may further comprise performing a fourth policy action of a fourth admission control policy in response to a third escalated congestion state, The fourth policy action may be dropping users at random. The method may further comprise escalating and de-escalating a congestion state based on periodically evaluating congestion of the shared backhaul connection. Congestion may be one of errors, dropped packets, a high measured error rate, a high measured carried throughput that may be close to theoretical peak throughput, or estimated future congestion. The shared-backhaul telecommunications network may be a mesh network and each node in the mesh network may be a base station implementing the admission control policy.

In a second embodiment, a gateway node is disclosed that is configured to provide congestion mitigation, comprising: an inbound interface for receiving data from a plurality of base stations; an outbound backhaul interface for sending data toward a mobile operator core network; and a processor configured to: assess a congestion state in a multi-node radio access network having a shared backhaul connection, the congestion state based on congestion of the shared backhaul connection; retrieve an admission control policy based on the congestion state of the shared backhaul connection; perform a policy action of the admission control policy at a first base station acting as a gateway for the multi-node radio access network with respect to the shared backhaul connection; and send the admission control policy to other nodes in the multi-node radio access network, thereby causing the other nodes to perform the policy action, The policy action may be denying a request from a user equipment to attach to the radio access network. The processor may be further configured to perform a second policy action of a second admission control policy in response to a first escalated congestion state, The second policy action may be dropping existing connections to user equipments that have only non-prioritized data connections. The processor may be further configured to perform a third policy action of a third admission control policy in response to a second escalated congestion state, The third policy action may be preempting existing prioritized user data connections in favor of higher-priority user data connections. The processor may be further configured to perform a fourth policy action of a fourth admission control policy in response to a third escalated congestion state, The fourth policy action may be dropping users at random. The processor may be further configured to escalate and de-escalate a congestion state based on periodically evaluating congestion of the shared backhaul connection. Congestion may be one of errors, dropped packets, a high measured error rate, a high measured carried throughput that may be close to theoretical peak throughput, or estimated future congestion. The shared-backhaul telecommunications network may be a mesh network and each node in the mesh network may be a base station implementing the admission control policy.

DETAILED DESCRIPTION

The detailed description set forth below is intended as a description of various configurations of the subject matter and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details. In some instances, well-known structures and components are shown in block diagram form in order to avoid obscuring the concept of the subject technology.

Overview

It is possible to use multiple forms of backhaul to connect to a core network from a base station, including wired, LTE, microwave, satellite, etc. For example, in the Parallel Wireless architecture, in the 3G architecture, and in recent proposed versions of the 5G architecture, a base station communicates with a coordinating node located between the radio access network (RAN) and the core network. In the situation where a base station uses a wireless backhaul link, communications from the base station to the coordinating node may flow through a secured tunnel through the intermediary nodes before reaching the coordinating node and entering into an unencrypted core network environment. For wireless backhaul using Long Term Evolution (LTE), the base station may have an onboard LTE modem, in some embodiments, which can attach to an existing LTE network and provide IP connectivity.

It is also possible to use a mesh network to connect to a core network from a base station to provide backhaul. A mesh network includes several mesh nodes, which flexibly route traffic to an appropriate point of egress for the traffic; benefits of a mesh network include resiliency, since any failures can be routed around, and congestion tolerance, as congestion is tolerated as is any other failure. However, mesh networks typically have a few nodes that are connected more directly to the core network or with more robust, higher throughput, or higher availability backhaul links to the core network, and these nodes, called mesh gateway nodes, can become overwhelmed when they provide backhaul capability to a large number of mesh nodes. For example, if each mesh node is providing wireless connectivity/access to a handful of mobile devices, any one mesh node can be backhauled by a mesh gateway node without issue, but the mesh gateway node may become congested when a large number of mesh nodes is backhauled by a single mesh gateway node. The mesh network may include one or more wireless links.

This solution makes possible to prioritize traffic based on class of traffic (streaming/interactive etc.) This solution makes possible to shape traffic based on transport and usage, for e.g. LTE or 3G data vs. Infrastructure. This solution can also add categories/transports etc. This solution makes possible to reserve certain band-width for infrastructure traffic which will also be the highest priority. Signaling traffic as defined above would/might also get separate bandwidth or at-least a QCI map (for LTE backhaul). This solution makes possible to limit the signaling traffic from 1 transport so that it does not take down all the others in case of adverse network conditions or scenarios like LTE paging flood. This solution makes possible to shape Data traffic for each transport (LTE, 3G etc.) independently. This solution makes possible to special handling to certain priorities (e.g. VoLTE traffic), similarly certain access categories/classes like emergency bearer might require special handling. The DSCP values for the user traffic could be preserved.

Use Cases

Four exemplary use cases are described. In a first use case, several cells are deployed in a rural area and require wireless backhaul. An LTE macro cell is used to provide wireless backhaul for these cells, which may be via a mesh network or otherwise. A mix of voice and best effort IP traffic is required to be transported over the wireless RAN, and causes the backhaul link to become congested, but in the conventional case it is difficult if not impossible to cause the best effort traffic to be delivered at reduced priority, because of the shared backhaul. In a second use case, emergency services traffic is required to be transported over the aforementioned several cells; however, the capacity of the in-band wireless LTE macro cell fluctuates due to RF conditions and also from congestion (pressure from macro capacity), causing emergency traffic to fail to be delivered appropriately, and for such traffic to fail to be prioritized when it reaches the shared backhaul relative to other non-emergency services traffic. The emergency services traffic may be a mix of VoLTE, push to talk, and mission critical data.

In a third use case, involving the use of VoLTE and PTT capacity on the aforementioned in-band macro backhaul is reduced due to higher priority macro traffic. In an emergency scenario the macro traffic may end up being almost entirely of higher priority traffic, and the shared gateway node requires IP traffic, which is conventionally handled as a non GBR (non-guaranteed bit rate) connection, causing the shared backhaul gateway node to fail to be allocated sufficient resources. A further concern is that, even if we permit a higher prioritization of the gateway node's traffic on the in-band backhaul, this has to be controlled and limited due to adverse effects on other macro users. In a fourth use case, even when high-priority voice (GBR) as well as best effort (non-GBR) traffic is required to be transmitted via the gateway node, the gateway node does not have enough capacity to handle the traffic.

Each of these situations is handled or mitigated by the present disclosure.

Admission Control Process

In some embodiments, a mesh network of base stations is provided that connect to each other to provide an access network. The present invention can also be used, in some embodiments, in conjunction with base stations that share one or a plurality of backhaul connections, since such a network configuration is analogous to a mesh network in which there are one or a plurality of egress points. Such a non-mesh network can be referred to as a shared-backhaul access network. The shared backhaul may be one of the plurality of base stations in the access network, or may be an interconnect, gateway or router coupled to one or more base stations, or may be another network device operated in conjunction with the plurality of base stations and also with a coordinating server for managing the backhaul connection. The base stations may be multi-radio access technology (multi-RAT) base stations, supporting, e.g., 2G/3G/4G/5G/Wi-Fi or other radio access technologies. Since it is a non-mesh network, the network nodes may not be able to independently self-configure, and may be centrally controlled, for example by the coordinating server.

A shared-backhaul access network topology is useful in a variety of cases. For instance, a deployment of several base stations in a rural area may benefit from the use of a single base station for wirelessly backhauling the rural units, with the single egress base station itself using wired backhaul; or, a single backhaul connection or a small number of such connections can be used to control traffic flows going over the network as a gateway. In some embodiments, shared backhaul may be accomplished by the use of a UE modem connecting to an arbitrary wireless access network and tunneling back to the original core network, preferably on a different band than the band used for access by the other nodes in the RAN.

In some embodiments involving a shared-backhaul access network, congestion or other factors on the shared backhaul can be mitigated using the admission control techniques described in the present disclosure. For example, admission of a UE to any base station sharing the particular backhaul can be denied or prevented. For example, profiles for admission control may be propagated through the network, either peer-to-peer or from a centralized controller such as a Parallel Wireless HetNet Gateway (HNG)™. Further details regarding the controller server, the base stations in the access network, flow processing and traffic management on the backhaul connection are disclosed in the documents incorporated by reference.

Admission control as described herein involves at least: denial of attach (denial of RACH, etc.) in 3G/4G/5G; dropping of existing connections, bearers, or users; and preemption of existing connections, bearers or users. These admission control policies are understood to be preferentially applied by priority of traffic, including whether the traffic is GBR/non-GBR and whether the traffic is emergency services traffic, whether the traffic is video, mission critical, etc. using at least a mechanism like QCI to understand the nature of the traffic and to preferentially provide service to higher priority users. The inventors have understood and appreciated that admission control to a single cell is well-known in the art.

In use case #1, in some embodiments, Poor performance of Gateway Device because In-band Macro backhaul is overloaded. Problem: Emergency response network for public safety and first responders is required in extended coverage area. Weakest link is the In-band Macro backhaul. The capacity of the In-band Macro backhaul is fluctuating due to RF conditions and pressure from macro capacity. Scenario: There is a combination of Voice and Best effort traffic users on the LTE Access. Mitigation: once the GW node determines that that the backhaul link is congested and informs the LTE cell-Drop Best effort traffic users to prioritize Voice users to account for reduced backhaul bandwidth. Feature support required: a) Per link, available/carried throughput estimation; b) Collective Mesh, Admission control; c) Denial of new users when congestion is detected; d) Pre-emption of users, rather than degradation of all users.

In use case #2, in some embodiments, Poor performance of Gateway Device because In-band Macro backhaul is overloaded. Problem: Emergency response is required in extended coverage area. Weakest link is the In-band Macro backhaul. The capacity of the In-band Macro backhaul is fluctuating due to RF conditions and pressure from macro capacity. Scenario: There is a combination of VoLTE, MCPTT (mission-critical push-to-talk) and mission critical data users on the LTE access network. Mitigation: once the GW node determines that that the backhaul link is congested and informs the LTE cell-First prioritize MCPTT, then VoLTE and then mission critical data. If required, drop users doing low priority data access. Feature support required: a) Per link, available/carried throughput estimation; b) Collective Mesh, Admission control; c) Pre-emption of users, rather than degradation of all users.

In use case #3, in some embodiments, capacity on In-band Macro backhaul is starved by higher priority macro traffic. Problem: In an emergency scenario the macro traffic consist almost entirely of higher priority traffic w.r.t. GWD (CWS-210) Non GBR connection. The Gateway device is not allocated sufficient resources. Further concern, even if we permit a higher prioritization on the in-band backhaul this has to be controlled and limited due to adverse effects on other macro users. Scenario: There is a combination of VoLTE and MCPTT calls on the LTE access. Mitigation: once the GW node determines that that the backhaul link is congested and informs the LTE cell-Prioritize the MCPTT calls over the VoLTE. Feature support required: a) Per link, available/carried throughput estimation; b) Collective Mesh, Admission control; c) Denying access to new (low priority) users; d) If congestion becomes too high, then drop existing low priority users.

In use case #4, in some embodiments, capacity on In-band Macro backhaul is starved by higher priority macro traffic. Problem: In an emergency scenario the macro traffic consist almost entirely of higher priority traffic w.r.t. GWD (CWS-210) Non GBR connection. The Gateway is not allocated sufficient resources. Further concern, even if we permit a higher prioritization on the in-band backhaul this has to be controlled and limited due to adverse effects on other macro users. Scenario: High priority voice and best effort (non GBR) traffic users on the LTE access. Mitigation: once the GW node determines that that the backhaul link is congested and informs the LTE cell-Prioritize the high priority voice, if required drop the best effort. Feature support required: a) Per link, available/carried throughput estimation; b) Collective Mesh, Admission control; c) Denying access to new (low priority) users; d) If congestion becomes too high and only high priority users are remaining then implement random dropping.

The coordination node can determine one or more of: when a congestion state is reached; which admission control techniques should be used; and which base stations or UEs should implement (or should be subject to) the admission control policy. The coordination node may be the gateway node. The coordination node may perform these determinative steps in realtime, or in an offline process. The coordination node may base these determinative steps on: information derived from packet flows at the gateway node; derived from packet flows at the coordination node; shallow or deep packet inspection of flows; congestion signaling in the network; counters and alerts within the network pertaining to load or anything else; counters or alerts being collated at the coordinating node; measurements of available processor load at any network node or at the coordinating node or gateway; measurements of the network that is current or historical relating to throughput, utilization, latency, jitter, drop rate, signal to noise, coverage, user count, etc.; measurements of backhaul capacity that is current or historical relating to these factors, etc, in some embodiments. Statistics for one particular radio access technology may be used to make determinations about another radio access technology, in some embodiments.

The present disclosure is intended to be used in combination with QCI or other well-known QoS mechanisms.

In some embodiments, where congestion is assessed, a computation of congestion among many or all links in the mesh may be performed. In some embodiments, where congestion is assessed, a computation of congestion among many or all connections to UEs that are currently attached may be performed. In some embodiments, where congestion is assessed, future congestion, available throughput, carried (actual) throughput, etc. may be predicted/estimated and used to make a determination.

As used herein, congestion can be defined broadly as any level of network utilization that results in negative performance impacts on network traffic, and backhaul is defined broadly as the link or links that connects (connect) the radio access network (RAN) nodes at the edge of the network to one or more core networks or backbone networks, which typically have limited capacity compared to the links within the core network and are therefore the bottleneck for user data traffic. The present disclosure assesses congestion for a plurality of nodes, either in a mesh or in a shared-backhaul access network, and uses congestion of the gateway node or of one or more backhaul connections to propagate admission control policies throughout the rest of the plurality of access network nodes, thereby mitigating the congestion. In other words, congestion determinations from the limiting link in the network are used to perform mitigation actions at each base station is performed, in some embodiments. Congestion can include errors or dropped packets, in some embodiments. Congestion can include a high measured error rate, in some embodiments. Congestion can include a high measured carried throughput that is close to theoretical peak throughput, in some embodiments. Congestion can include estimated future congestion.

As used in the present disclosure, a policy is a set of rules for QoS, which may be applied to one or more UE connections, including bearers. The policies may encompass filtering, QCI/QOS tagging, etc., as well as admission control. The policies may be communicated throughout the network as described herein, and may be stored at each individual node or may be retrieved on demand from a coordinating server or a policy server. Different policies may be applied to different UE connections, in some embodiments. A policy may take effect on the backhaul egress node, on all RAN nodes in the network, or any subset of the RAN nodes of the network. Congestion on intra-mesh links (links internal to the mesh) may also be mitigated selectively by application of policies to different nodes on the network, including for example to nodes that act as gateway nodes to some subset of the mesh network for complex configurations of mesh.

In conjunction with the QoS class identifier (QCI) and certain bit rate parameters (Guaranteed Bit Rate, Maximum Bit Rate, Aggregate Maximum Bit Rate), QoS may be supported by the base station.

In some embodiments, ARP (Allocation and Retention Priority) may be used, in conjunction with the methods described herein. ARP is part of the quality of service (QoS) scheme for 4G LTE and other telecommunications standards, and is a parameter provisioned from the core network to the base station to tell the base station when a particular bearer (or connection) should be released or retained. In some embodiments, ARP (Allocation and Retention Priority) or ECN (Explicit Congestion Notification) could be used to communicate thresholds for congestion levels (3GPP TS 23.401 V8.0.0 (2007-12) hereby incorporated by reference). ARP is not conventionally used for collective admission control, but advertising congestion information throughout the mesh or radio access network is possible, allowing enforcement of the policies described herein throughout the mesh (or shared-backhaul access network). In some embodiments, ARP may be set, determined, or changed by a control gateway or by the base station (eNB) itself to enable the operation of the admission control policies described herein. In some embodiments, an equivalent to ARP may be used for the relevant access technology. For example, ARP is used in 3G (UMTS) and 4G (LTE), as well as for certain UEs in 5G. A proprietary vendor extension may be used where ARP is not available, for example for Wi-Fi or 5G in some cases. In the case of 5G, where network slicing is used, a single coordinating server may provide coordination of ARP and admission control transparently across multiple network slices, in some embodiments. The coordinating server may use QOS information pertaining to the network slices to provide admission control policies that apply appropriately to the various slices.

In some embodiments, ECN may be used for end-to-end congestion notification and awareness. Explicit Congestion Notification (ECN) is an extension to the Internet Protocol and to the Transmission Control Protocol and is defined in RFC 3168 (2001). ECN allows end-to-end notification of network congestion without dropping packets. ECN is an optional feature that may be used between two ECN-enabled endpoints when the underlying network infrastructure also supports it. Conventionally, TCP/IP networks signal congestion by dropping packets. When ECN is successfully negotiated, an ECN-aware router may set a mark in the IP header instead of dropping a packet in order to signal impending congestion. The receiver of the packet echoes the congestion indication to the sender, which reduces its transmission rate as if it detected a dropped packet, but without requiring the time-consuming and throughput-reducing process of renegotiating the transmission rate via exponential backoffs. In the present disclosure, ECN may be used for its inherent advantages and may also be used to signal congestion of one or more links to the nodes determining congestion for purposes of administering an admission control policy. We can use ECN to push a signal to the UE to slow down; allows end-to-end congestion notifications and control. Congestion information may be used in the congestion determining step to determine a congestion level, in some embodiments. In some embodiments we can push this signal to other mesh network nodes. In some embodiments another signal, or X2/Xx/Xn, or some combination of the above, could be used. In some embodiments, ARP, ECN could be adjusted on each bearer or flow at the gateway node or at each base station in the access network.

In some embodiments, individual UE connections, such as data bearers, could be assessed for their currently assessed QoS level, including whether a bearer is GBR or non-GBR. This assessment could be used to determine congestion, for example, at a coordinating server, and to send an instruction to perform congestion mitigation. Once congestion is determined, coordination could be performed between the coordination server and the one or more base stations in the mesh network or the radio access network to perform the congestion mitigation. In some embodiments, one or more congestion control policies could be applied to individual nodes, bearers, and/or links. The congestion control policies may involve controlling admission of UEs to the access network, i.e., access admission control. In some embodiments, messages may be passed to the UE from the base station to implement admission control policies, for example, to reject a UE attach request.

Once congestion is detected, in some embodiments a determination is made regarding how to provide prioritization, and how to allocate the available throughput to the various mesh/access network nodes. In some embodiments, bandwidth estimation and bandwidth negotiation over assignment of the backhaul may take place among the plurality of mesh nodes. In some embodiments, bandwidth estimation and assignment of backhaul may be performed by the centralized controller.

In some embodiments, it is possible to escalate congestion state until congestion stops, and then could reset the congestion state; or, could periodically assess and increase/decrease the congestion state In some embodiments, it is possible to also be applied to 2G, 3G, 5G, or Wi-Fi admission control, mesh or shared backhaul. In some embodiments, it is possible to also be applied to inter-RAT admission control, e.g., congestion on one RAT being used to control admission on another RAT In some embodiments, it is possible to also be used on other ToS tags or data, other than QCI and GBR/non-GBR, potentially using DPI In some embodiments, it is possible to be performed at any node in the mesh. In some embodiments, relative priorities for different QCI's (GBR and Non-GBR) could be contained as part of a policy.

In some embodiments, the present disclosure could be used to answer another formulation of this problem: how to find the connection using the most bandwidth across all the nodes in the mesh, and then drop it?

Figures

Figure 1:
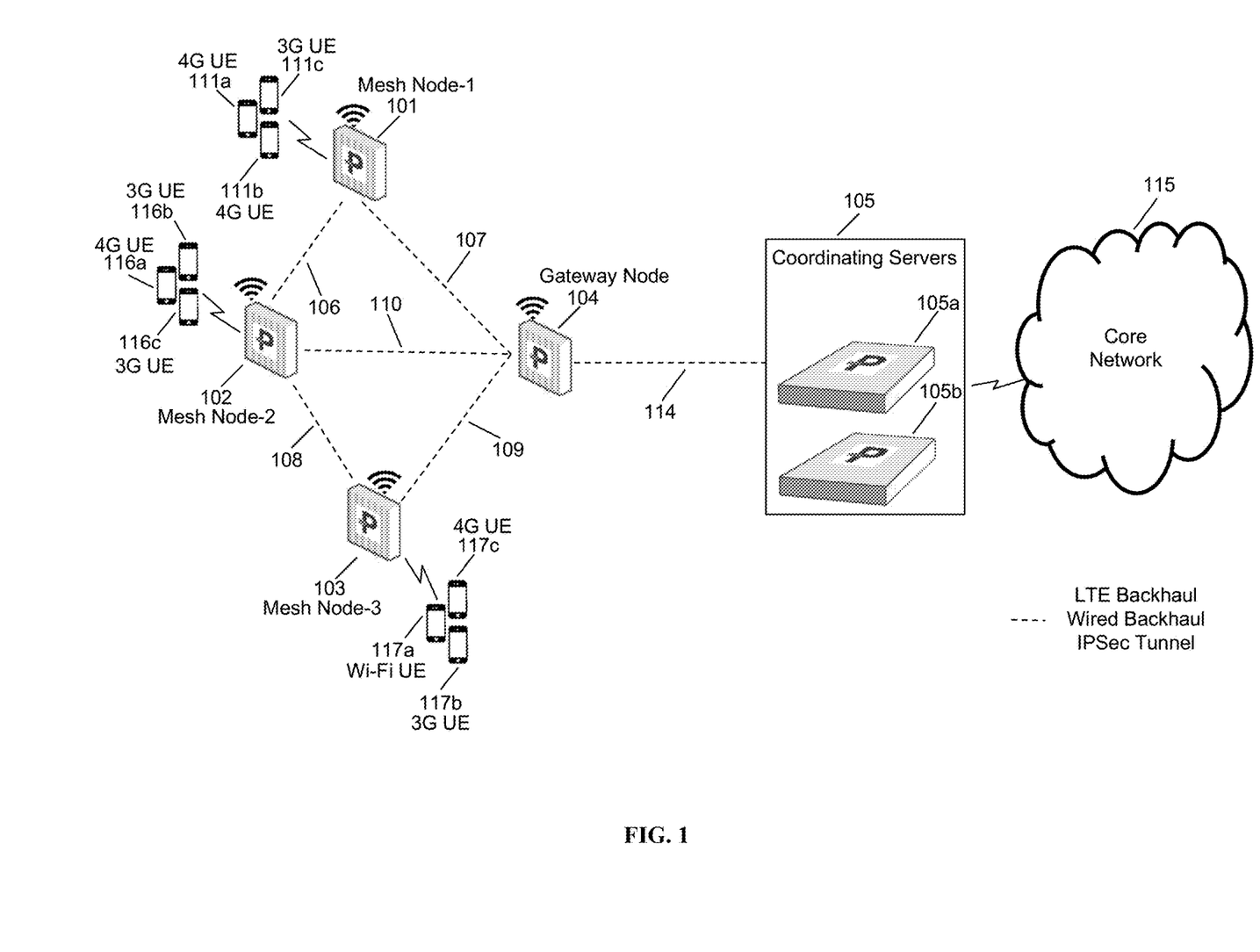
FIG. 1 is a network diagram in accordance with some embodiments.

FIG. 1 is a network diagram in accordance with some embodiments.

In some embodiments, as shown in FIG. 1, a mesh node 1 101, a mesh node 2 102, and a mesh node 3 103 are multi-radio access technology (multi-RAT) base stations. Base stations 101, 102, and 103 form a mesh network establishing mesh network links 106, 107, 108, 109, and 110 with a base station 104. The mesh network links are flexible and are used by the mesh nodes to route traffic around congestion within the mesh network as needed. The base station 104 acts as gateway node or mesh gateway node, and provides backhaul connectivity to a core network to the base stations 101, 102, and 103 over backhaul link 114 to a coordinating server(s) 105 and towards core network 115. The Base stations 101, 102, 103, 104 may also provide eNodeB, NodeB, Wi-Fi Access Point, Femto Base Station etc. functionality, and may support radio access technologies such as 2G, 3G, 4G, 5G, Wi-Fi etc. The base stations 101, 102, 103 may also be known as mesh network nodes 101, 102, 103.

The coordinating servers 105 are shown as two coordinating servers 105a and 105b. The coordinating servers 105a and 105b may be in load-sharing mode or may be in active-standby mode for high availability. The coordinating servers 105 may be located between a radio access network (RAN) and the core network and may appear as core network to the base stations in a radio access network (RAN) and a single eNodeB to the core network, i.e., may provide virtualization of the base stations towards the core network as described in, e.g., U.S. Pat. No. 5,491,801, hereby incorporated by reference in its entirety. As shown in FIG. 1, various user equipments 111a, 111b, 111c are connected to the base station 101. The base station 101 provides backhaul connectivity to the user equipments 111a, 111b, and 111c connected to it over mesh network links 106, 107, 108, 109, 110 and 114. The user equipments may be mobile devices, mobile phones, personal digital assistant (PDA), tablet, laptop etc. The base station 102 provides backhaul connection to user equipments 112a, 112b, 112c and the base station 103 provides backhaul connection to user equipments 113a, 113b, and 113c. The user equipments 111a, 111b, 111c, 112a, 112b, 112c, 113a, 113b, 113c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 111a, 111b, 111c, 112a, 112b, 112c, 113a, 113b, and 113c, the uplink 114 may get congested under certain circumstances. As described above, to continue the radio access network running and providing services to the user equipments, the solution requires prioritizing or classifying the traffic based at the base stations 101, 102, 103. The traffic from the base stations 101, 102, and 103 to the core network 115 through the coordinating server 105 flows through an IPSec tunnel terminated at the coordinating server 105. The mesh network nodes 101, 102, and 103 adds IP Option header field to the outermost IP Header (i.e., not to the pre-encapsulated packets). The traffic may from the base station 101 may follow any of the mesh network link path such as 107, 106-110, 106-108-109 to reach to the mesh gateway node 104, according to a mesh network routing protocol; an example protocol is found in U.S. Pat. App. Pub. No. US20160308755A1, hereby incorporated by reference in its entirety. In the case that traffic from the base station 101 flows through mesh network 102 in the case the path selected is 106-110 to reach to the mesh gateway node 104, the mesh network node 102 may not remove the IP Options header added by the base station 101 in the outer most IP Header. In an alternate embodiment, the base station 102 may update the IP Options header field with a different value of traffic classification.

In some embodiments, the mesh gateway node 104 receives the message with QoS headers, such as the IP Options header described in US20180123950A1 above, and may parse the IP Options header to extract a traffic classification value. The mesh gateway node 104 may map the traffic classification, as extracted from the fourth octet of the IP Options header, to a proper DSCP value to encode in messages or packets towards the coordinating server. The mesh gateway node 104 may alternately or in conjunction map the traffic classification to a proper QCI value, if the uplink is through an LTE modem backhaul uplink to a macro eNodeB through another operator core network. The mesh gateway node 104 receives the instructions on how to map the traffic classification to the DSCP/QCI as a configuration or a template from the coordinating server 105.

In some embodiments, as well as applying DSCP and/or QCI values, and depending on the congestion as calculated by the mesh gateway node 104 based on performance measurements, statistics, internal and external KPIs, and measurement of bandwidth available at the mesh gateway node 104, the mesh gateway nodes may put the packets in a different priority message queue. The mesh gateway node 104 may also adjust the available mesh link bandwidth or uplink bandwidth assigned to mesh nodes 101, 102, 103 based on the congestion level and traffic load for varying priority level identified from the traffic classification field of the IP Options header. In some embodiments, these steps may be performed not at the mesh gateway node but at the coordinating servers 105.

Figure 2:
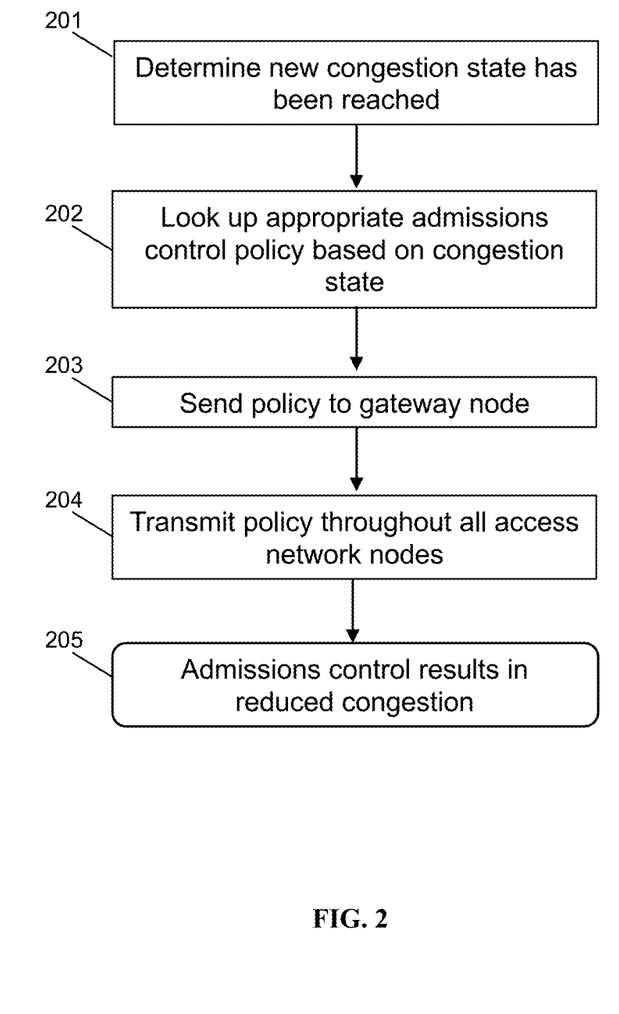
FIG. 2 is a flowchart showing an overview of admissions control for congestion mitigation, in accordance with some embodiments.

FIG. 2 is a flowchart showing an overview of admissions control for congestion mitigation, in accordance with some embodiments. At 201, congestion is evaluated either at a base station, the gateway/egress node, or the coordinating server, resulting in a determination that a new congestion state has been reached, for example, congestion going from zero to above a first threshold to a first congestion level. At 202, admissions control policies may be looked up from a table or memory (including statically compiled into a binary as part of executable code) to determine what policy is appropriate given the congestion state. At 203, the policy is instituted by instructing the gateway node to institute the policy, either directly if computation is already being performed there, or by message if being performed at another node such as the coordinating server. At 204, the policy is also transmitted throughout the access network, potentially to all RAN nodes, resulting in a more significant reduction in congestion than would result if only the gateway RAN node were to be subject to the new policy. This immediately reduces the congestion pressure from new connections to the entire mesh network. At 205, admission control results in reduced congestion.

Figure 3:
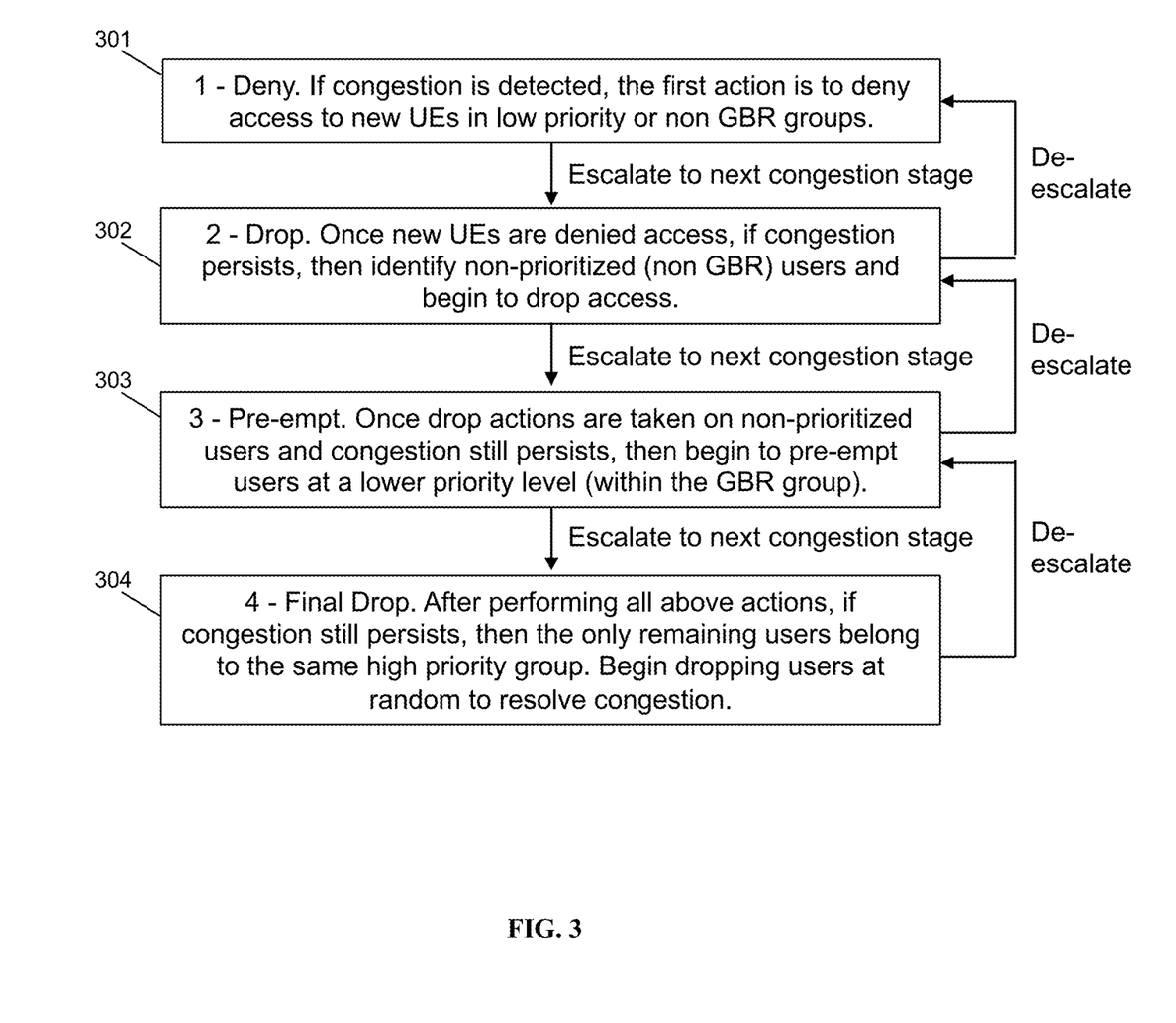
FIG. 3 is a flowchart showing policy escalation, in accordance with some embodiments.

FIG. 3 shows an escalation sequence showing recommended congestion mitigation actions, in accordance with some embodiments. At any particular step, after a new policy is instituted, a timer may be allowed to expire, to allow the new policy to have the desired effect of reducing congestion. The congestion state is evaluated again after the timer expires, to determine whether the congestion state has increased (in which case escalation to the next congestion stage occurs), or decreased (resulting in de-escalation), or has stayed the same (resulting in no policy change). Different escalation/de-escalation sequencing is contemplated by the inventors, for example, de-escalating all the way back to baseline (no admission control) in a single step, or skipping straight to a higher escalation level based on high congestion.

At 301, after an initial congestion level is detected, a Deny policy may be instituted. If congestion is detected, the first action is to deny access to new UEs in low priority or non GBR groups. At 302, upon escalation, Drop. Once new UEs are denied access, if congestion persists, then identify non-prioritized (non GBR) users and being to drop access. At 303, upon further escalation, Pre-empt. Once drop actions are taken on non-prioritized users and congestion still persists, then begin to pre-empt users at a lower priority level (within the GBR group). At 304, upon further escalation, Final Drop. After performing all above actions, if congestion still persists, then the only remaining users belong to the same high priority group. Begin dropping users at random to resolve congestion.

Figure 4:
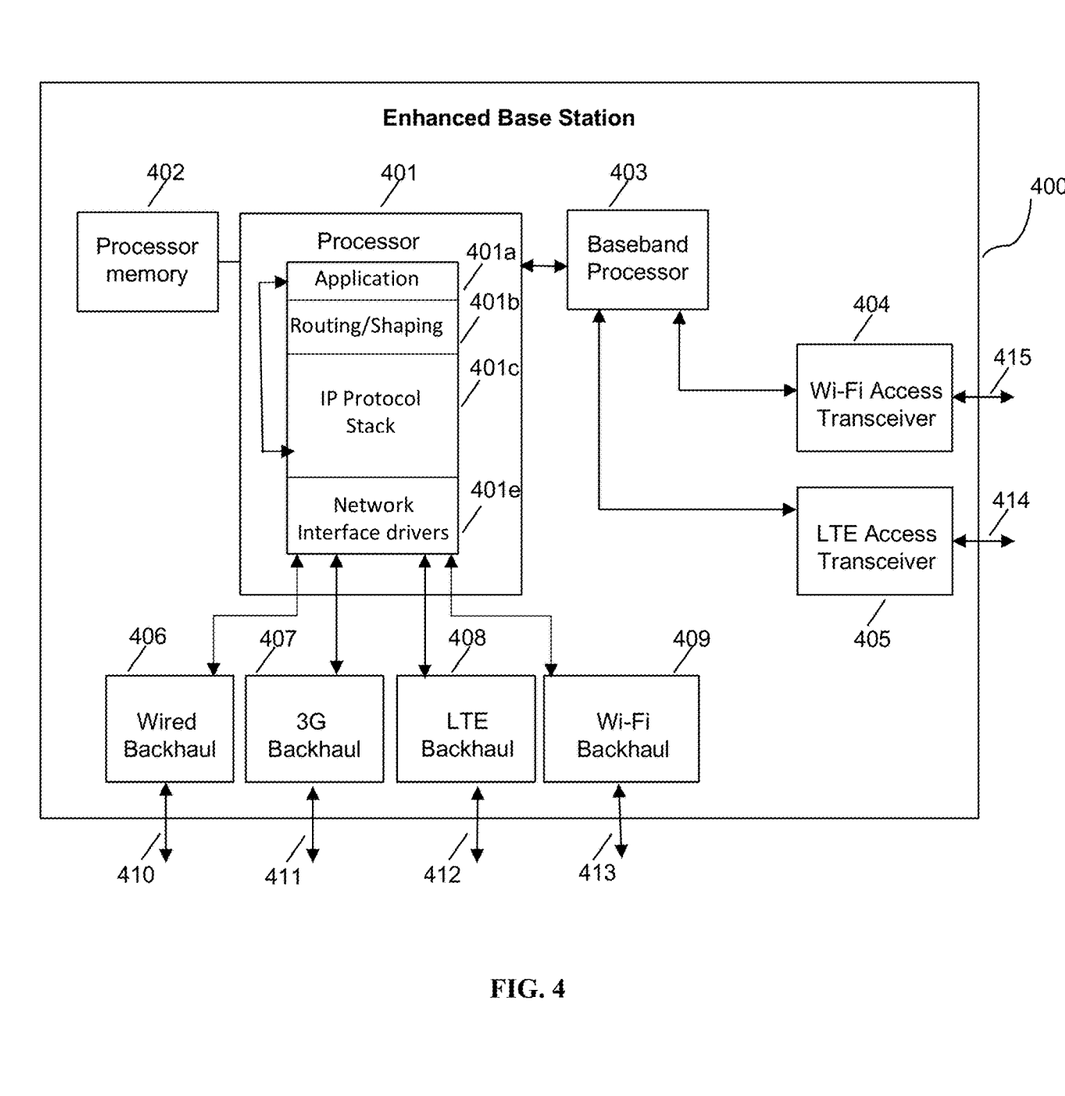
FIG. 4 is a schematic architecture diagram of an exemplary base station, in accordance with some embodiments.

FIG. 4 is a schematic diagram of an enhanced eNodeB, in accordance with some embodiments. Enhanced eNodeB 400 may include processor 401, processor memory 402 in communication with the processor, baseband processor 403. Enhanced eNodeB 400 may also include Wi-Fi access transceiver 404 with access side interface 415, and LTE access transceiver 405 with access side interface 414 and thereby connecting to user equipments (not shown in the figure). Enhanced eNodeB 400 may also include wired backhaul 406 with wired backhaul interface 410, 3G backhaul 407 with 3G backhaul interface 411, LTE backhaul 408 with LTE backhaul interface 412, and Wi-Fi backhaul 409 with Wi-Fi backhaul interface 413. Enhanced eNodeB provides backhaul connectivity via backhaul interfaces 410, 411, 412, and 413 to user equipments connected to the enhanced eNodeB via access interfaces 414 and 415. As shown in the FIG. 4, LTE access transceiver 405 and Wi-Fi access transceiver are further in communication with baseband processor 403 that is also in communication with processor 401.

Processor 401 and baseband processor 403 are in communication with one another. Processor 401 may perform routing functions, and may determine if/when a switch in network configuration is needed. Baseband processor 403 may generate and receive radio signals for both wi-fi access transceiver 404 and LTE access transceiver 405, based on instructions from processor 401. In some embodiments, processors 401 and baseband processor 403 may be on the same physical logic board. In other embodiments, they may be on separate logic boards.

The LTE access transceiver 405 may be a radio transceiver capable of providing LTE eNodeB functionality, and may be capable of higher power and multi-channel OFDMA. The LTE backhaul 408 may be a radio transceiver capable of providing LTE UE functionality. Both 405 and 408 are capable of receiving and transmitting on one or more LTE bands. In some embodiments, either or both of transceivers 405 and 408 may be capable of providing both LTE eNodeB and LTE UE functionality. Transceivers 405 and 408 may be coupled to processor 401 via baseband processor 403. In addition, wired backhaul 406 coupled to processor 401 may provide backhaul connectivity to other 3G femto base station via wired Ethernet interface 410. 3G backhaul 407 coupled to processor may provide 3G wireless backhaul connectivity.

Wired backhaul 406, or wireless backhaul 409, or any combination of backhaul, may be used. Wired backhaul 406 may be an Ethernet-based backhaul (including Gigabit Ethernet), or a fiber-optic backhaul connection, or a cable-based backhaul connection, in some embodiments. Additionally, wireless backhaul 409 may be provided in addition to 3G backhaul 407 and LTE backhaul 408, which may be Wi-Fi 402.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 401 may identify the appropriate network configuration and may perform execute instructions stored in processor memory 402 for admission control, application layer processing 401a, routing and shaping 401b of packets from one network interface to another accordingly. Processor 401 manages internal policy state and monitoring, determines local congestion, and communicates with the coordinating node. Processor 401 may use memory 402, in particular to store a routing table to be used for routing packets. Baseband processor 403 may perform operations to generate the radio frequency signals for transmission or retransmission by transceivers such as 404, 405, 407, 408, 409. Baseband processor 403 may also perform operations to decode signals received by transceivers 404, 405, 407, 408, 409. Baseband processor 406 may use memory 402 to perform these tasks. Further, processor 401 may perform tagging at tagger 401d that may be part of IP protocol functionality 401c in communication with application layer 401a. Network interface drivers 401e may send and receive messages over backhaul interfaces 410, 411, 412, 413 via 406, 407, 408, 409 respectively.

In operation, packets may be received from access transceivers 404, 405 and may be processed by processor 401 to determine what type of tagging is required. The packets may be tagged by tagger 401d in conjunction with program logic in application 401a, which identifies the type of traffic. Prioritization is performed at routing/shaping layer 401b, which issues instructions to IP protocol stack 401c to enqueue packets for the backhaul link(s), and the queued packets are sent out via network interface driver 401e to backhaul interfaces 406, 407, 408, 409. Admission control is handled at application level 401a (the RAN PHY is the application in this case).

Figure 5:
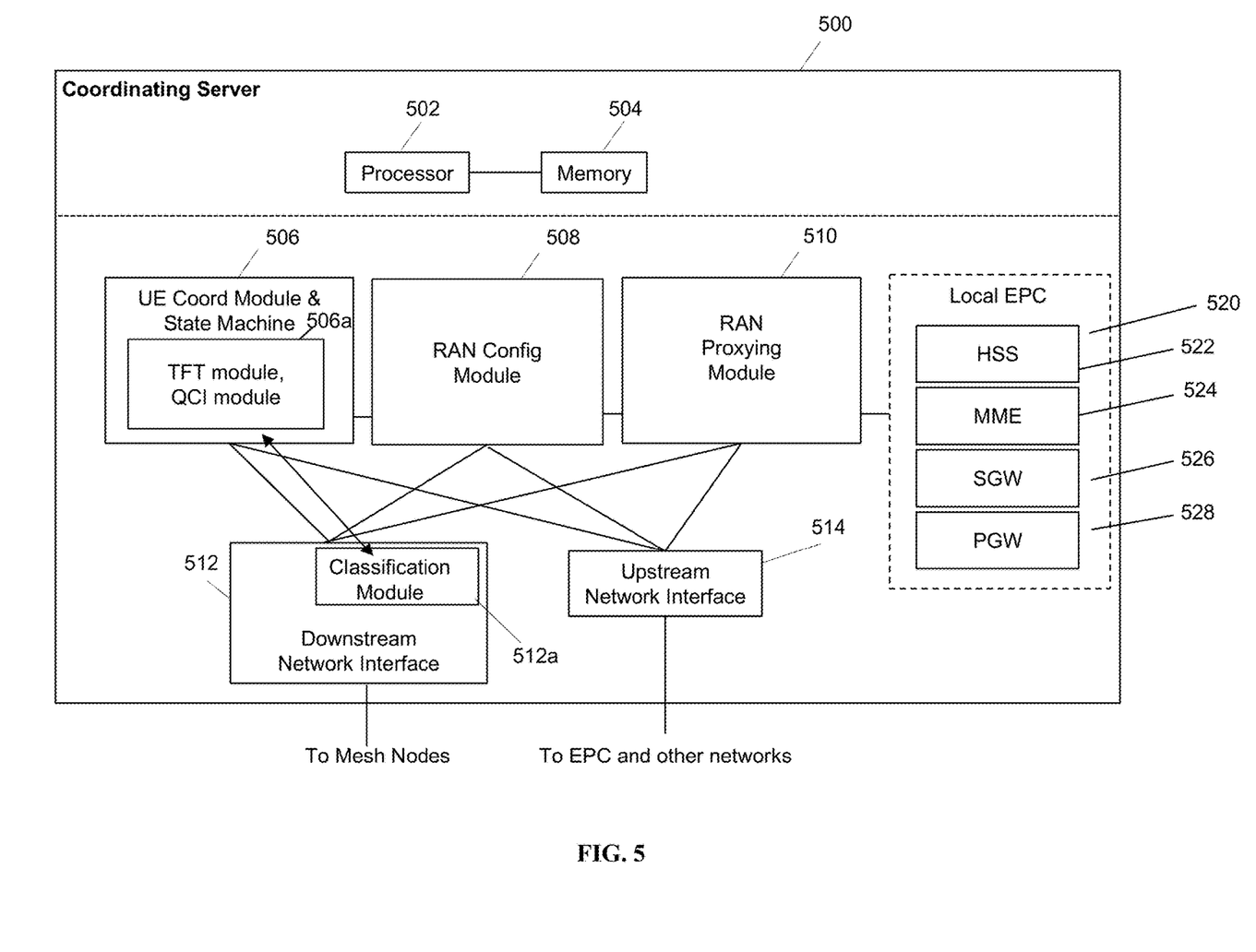
FIG. 5 is a schematic architecture diagram of an exemplary coordinating server, in accordance with some embodiments.

FIG. 5 is a schematic diagram of a coordinating node, in accordance with some embodiments. The coordinating node may also be known as coordinating server in this disclosure. Coordinating node 500 includes processor 502 and memory 504, which are configured to provide the functions described herein. Also present are UE coordination module and state machine 506, RAN configuration module 508, and RAN proxying 510. UE coordination module 506, and in particular TFT module/QCI module 506a, may perform the functions described herein for QOS management and admission control, including estimating bandwidth, determining congestion, and classifying bearers in conjunction with classification module 512a. RAN configuration module 508 may coordinate installed admission control policies across the network (e.g., at eNodeBs), may keep track of which policies have been sent to which nodes in the mesh and may also send policies to the nodes. RAN configuration module 508 is aware of which node is the backhaul egress node (or nodes). In some embodiments, coordination server may also provide proxying, routing virtualization and RAN virtualization, via module 510. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet). Downstream network interface 512 may further include classification module 512a in communication with TFT module/QCI module 506a. Classification module 512a may perform classification of traffic before sending messages to mesh nodes in the downstream direction. Signaling storm reduction functions may be performed in module 506. The coordinating node may be located in the network as shown in FIG. 1 as signaling coordinator 105.

Coordinating node 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In some embodiments, the gateway of FIG. 5 may be a virtualized radio access network or may provide virtual network functions (VNFs). For example, the gateway of FIG. 5 may be equipped and provisioned to provide a cloud radio access network (CRAN) virtual network function (VNF), with real-time elastic scheduling, real-time X2 brokering, real-time self-organizing network (SON) capability with load balancing, mobile edge computing (MEC) capability, video traffic optimization, software defined networking (SDN) with unlicensed assisted backhaul and quality of experience (QoE) management. The VNFs provided on this gateway may be located at a particular hardware node or moved around in containers or virtual machines within a data center. The latency characteristics of the global scheduler described herein are flexible, as it is possible to provide helpful hints and hash keys for resources even with latencies of tens or hundreds of milliseconds. Therefore, the flexibility of a virtualized global scheduler is greater than that of a convention cloud radio access network (CRAN) infrastructure.

Alternatives

The below alternatives apply to one or more embodiments of the present disclosure.

Estimation and Adjustment

Estimation of the actual bandwidth and pipe size may be performed at the mesh gateway node, or at another node providing shaping as described herein, based on observed packet loss at the shaping node. It may be proper to underestimate the pipe rather than overestimate. Estimation and adjustment involves task of adjusting pipe parameters based on estimates. It may also track the WAN IPs for the gateway nodes and move the pipes accordingly. It may interwork with the routing protocol used on the mesh network, such as described in US20160308755A1, hereby incorporated by reference, in particular by providing the estimated bandwidth/pipe size to the routing algorithm.

Traffic shaping may be performed based on input to admission control and SON to adjust the cell parameters according to available bandwidth. Shaping may be influenced by the estimated bandwidth. For example, if an estimated minimum bandwidth is known to be required by a particular mesh node, an estimate for all mesh nodes and all types of traffic may be obtained at the mesh gateway node, and the mesh gateway node may then perform shaping to enable all types of traffic to pass through in an appropriate quantity or degree.

In some embodiments, specific examples of the use of the admission control techniques can be understood in a non-mesh context by applying the same use cases presented above to base stations that are not meshed together but are instead configured in a statically-configured network design.

In some embodiments, different policies could be applied to in-band or out-of-band backhaul congestion, for voice or best effort users, for gateway nodes and non-gateway nodes, etc. In some embodiments, policies could be applied to reduce processor utilization and other types of load at a gateway node, as well as network and backhaul congestion. In some embodiments, denial, preemption, degradation, and/or drop may be used as policies applied against various different subsets of users.

In some embodiments, where a coordinating server is described throughout this disclosure, the inventors have appreciated that such a coordinating server could be located at various points throughout the core network, or at the one or more gateway nodes in a mesh network, or at the one or more gateway nodes in a shared-backhaul network, including performing one or more steps described herein. In a preferential embodiment, the coordinating server may be positioned between the RAN and the core network and may act as a gateway. The use of the word "gateway" in the present disclosure should be understood to mean the coordinating server, where appropriate from context, or a mesh/shared backhaul network node providing egress or backhaul from the RAN to a core network, where appropriate from context. In some cases both a backhaul gateway (in the mesh or shared backhaul RAN) and a virtualizing gateway (the coordinating server) may be present in the same network and roles and responsibilities may be spread or shifted appropriately across both gateways.

In some embodiments, instead of a mesh, a single node may be connected to a core network and may perform both the classification and shaping functions described herein. For example, an in-vehicle node may act as access node and gateway node for communicating with the core network. The techniques described herein may still provide additional classification flexibility over the existing IP TOS- and QCI-based methods.

In some embodiments, in the case of the use of an LTE interconnect, such as a direct connection to an LTE network, a TFT which would translate the TOS marking to an appropriate QCI value could be used. Also, it could be used with support of multiple bearers from the operator.

In some embodiments, in the case of an external modem LTE interconnect, a different UE modem could be used to connect to LTE backhaul, which could result in interconnection to the primary LTE network via a secondary LTE network (passthrough LTE network). Modem support for TFT and multiple bearer establishment may be used.

In some embodiments, in the case of backhaul using DSL or another backhaul infrastructure network, support of ToS markings in the interconnect network could be used, to supplement or stack with the present description.

Virtual tunnel interfaces (VTIs) could be used in conjunction with IPsec, in some embodiments. Estimation and adjustment of pipe size could be performed, in some embodiments. SON Interworking for admission control, Transmit Power adjustment etc. could be performed, in some embodiments. Handling the nodes behind NAT could be performed, in some embodiments. Shaping at non-gateway nodes could be performed, in some embodiments. Allowances for configurable categories could be enabled, in some embodiments. The same modem could link to different operators, who might have different TFTs and require different maps, in some embodiments. Application-level throttling could be performed, in some embodiments.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for congestion mitigation via admission control in a shared-backhaul telecommunications network, comprising:
assessing, by a limiting link of the network having a shared backhaul connection a congestion state in a multi-node radio access network having a shared backhaul connection, the congestion state based on congestion of the shared backhaul connection;
retrieving an admission control policy based on the congestion state determined by the limiting link, the admission control policy including an Allocation and Retention Priority (ARP);
sending the admission control policy to other nodes in the multi-node radio access network;
providing, by a coordinating server, coordination of ARP and admission control across multiple networks on a common physical infrastructure;
performing a policy action of the admission control policy at the other nodes of the multi-node radio access network with respect to the shared backhaul connection; and
performing a second policy action of a second admission control policy in response to a first escalated congestion state, wherein the second policy action is dropping existing connections to user equipments that have only non-prioritized data connections,
wherein the policy action is denying a request from a user equipment to attach to the radio access network.

2. The method of claim 1, further comprising performing a third policy action of a third admission control policy in response to a second escalated congestion state, wherein the third policy action is preempting existing prioritized user data connections in favor of higher-priority user data connections.

3. The method of claim 1, further comprising performing a fourth policy action of a fourth admission control policy in response to a third escalated congestion state, wherein the fourth policy action is dropping users at random.

4. The method of claim 1, further comprising escalating and de-escalating a congestion state based on periodically evaluating congestion of the shared backhaul connection.

5. The method of claim 1, wherein congestion is one of errors, dropped packets, a high measured error rate, a high measured carried throughput that is close to theoretical peak throughput, or estimated future congestion.

6. The method of claim 1, wherein the shared-backhaul telecommunications network is a mesh network and each node in the mesh network is a base station implementing the admission control policy.

7. The method of claim 1, further comprising applying different policies to different UE connections.

8. The method of claim 1 wherein retrieving an admission control policy comprises retrieving an admission control policy including a set of rules for QoS, filtering, QoS class identifier (QCI)/QoS tagging, and admission control.

9. The method of claim 1 wherein the ARP is a parameter provisioned from a core network to a base station to tell the base station when a particular bearer or connection should be released or retained.

10. A gateway node configured to provide congestion mitigation, comprising: an inbound interface for receiving data from a plurality of base stations;
an outbound backhaul interface for sending data toward a mobile operator core network; and a processor configured to:
assess a congestion state in a multi-node radio access network having a shared backhaul connection, the congestion state based on congestion of the shared backhaul connection;
retrieve an admission control policy based on the congestion state of the shared backhaul connection, the admission control policy including an Allocation and Retention Priority (ARP);
send the admission control policy to other nodes in the multi-node radio access network;
provide, by a coordinating server, coordination of ARP and admission control across multiple networks on a common physical infrastructure;
perform a policy action of the admission control policy at the other nodes of the multi-node radio access network with respect to the shared backhaul connection; and
perform a second policy action of a second admission control policy in response to a first escalated congestion state, wherein the second policy action is dropping existing connections to user equipments that have only non-prioritized data connections,
wherein the policy action is denying a request from a user equipment to attach to the radio access network.

11. The gateway node of claim 10, wherein the processor is further configured to perform a third policy action of a third admission control policy in response to a second escalated congestion state, wherein the third policy action is preempting existing prioritized user data connections in favor of higher-priority user data connections.

12. The gateway node of claim 10, wherein the processor is further configured to perform a fourth policy action of a fourth admission control policy in response to a third escalated congestion state, wherein the fourth policy action is dropping users at random.

13. The gateway node of claim 10, wherein the processor is further configured to escalate and de-escalate a congestion state based on periodically evaluating congestion of the shared backhaul connection.

14. The gateway node of claim 10, wherein congestion is one of errors, dropped packets, a high measured error rate, a high measured carried throughput that is close to theoretical peak throughput, or estimated future congestion.

15. The gateway node of claim 10, wherein the shared-backhaul telecommunications network is a mesh network and each node in the mesh network is a base station implementing the admission control policy.

16. The gateway node of claim 10, wherein different policies are applied to different UE connections.

17. The gateway node of claim 10 wherein an admission control policy includes a set of rules for QoS, filtering, QoS class identifier (QCI)/QoS tagging, and admission control.

18. The gateway node of claim 10 wherein the ARP is a parameter provisioned from a core network to a base station to tell the base station when a particular bearer or connection should be released or retained.

* * * * *